United States Patent
Cisney

[15] 3,699,172
[45] Oct. 17, 1972

[54] HYDROXYMETHYL, METHYLTHIO PHENOLS

[72] Inventor: Merle E. Cisney, Camas, Wash.

[73] Assignee: Crown Zellerbach Corporation, San Francisco, Calif.

[22] Filed: Nov. 28, 1969

[21] Appl. No.: 880,908

[52] U.S. Cl. ............260/609 F, 252/404, 260/45.95, 260/57 R, 260/67.6 R, 260/69, 260/249.6, 260/574, 260/607 A, 260/607 B
[51] Int. Cl. ............................................C07c 149/36
[58] Field of Search ....................260/609 F

[56] References Cited

UNITED STATES PATENTS 2,362,289   10/1944   Mikeska.............260/609 F X

Primary Examiner—Lewis Gotts
Assistant Examiner—D. R. Phillips
Attorney—Limbach, Limbach & Sutton

[57] ABSTRACT

A substituted phenol having anti-oxidant properties. The phenol is substituted according to the formula

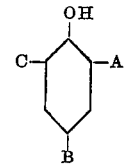

wherein A is a hydroxyalkyl having from one to about three carbon atoms, B is alkylthio having from one to about 12 carbon atoms and C is hydrogen or alkyl up to 12 carbon atoms.

2 Claims, No Drawings

HYDROXYMETHYL, METHYLTHIO PHENOLS

BACKGROUND OF THE INVENTION

This invention relates to novel substituted thiophenols and to the method of preparation of such compounds.

Sulfur-containing compounds in the form of polymers or in the form of large molecules having numerous sulfur atoms have been found to be useful as anti-oxidants. Without being limited to any particular theory, it is believed that the sulfur in the anti-oxidant reacts with the oxygen which normally degrades the material in which the anti-oxidant is used, so that the properties of the underlying material are unimpaired.

Various anti-oxidants have been disclosed in the prior art including bis-phenol sulfides, mercaptans and sulfonium compounds. However, substituted thiophenols, in particular substituted alkylthio-ortho-cresol compounds have not heretofore been prepared.

SUMMARY OF THE INVENTION AND OBJECTS

This invention relates to substituted phenols having a formula

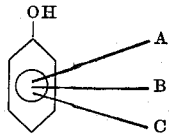

wherein A is hydroxyalkyl, B is alkylthio, and C is hydrogen, alkyl or aryl, in any order. The compounds are made by the reaction of an aldehyde with alkylthiophenols.

It is an object of this invention to prepare novel compounds of the foregoing formula.

It is a further object of this invention to provide an improved method of preparing such compounds.

DESCRIPTION OF THE PREFERRED EMBODIMENTS

Substituted thiophenols of the present invention have utility as anti-oxidants for organic materials, such as polymers, oils, rubber, fats and the like. In particular, polymerizable ethylenically unsaturated monomers are subject to degradation by oxygen. Polymers made from these monomers also are subject to degradation by oxygen so that anti-oxidant compounds are useful in this context. It is believed that anti-oxidants of the present invention absorb oxygen to react with sulfur atoms to result in formation of polymeric sulfoxides or sulfones.

Preparation of hydroxyaryl sulfonium chlorides are known according to the teachings of the U.S. Pat. No. 3,133,971. In that patent, preparation of hydroxyaryl sulfonium chloride is disclosed having the following formula:

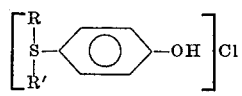

where R and R' are represented by an alkyl, aryl, aralkyl, or alkaryl radical and substituted derivatives thereof.

By subjecting the hydroxyaryl sulfonium chloride of U.S. Pat. No. 3,133,971 to heat, the compound breaks at the sulfur atom to form the alkylthiophenol R—S—101 OH and R'Cl.

In accordance with the present invention, alkylthiophenols are reacted with an aldehyde to form novel compounds according to the following formula:

(1) 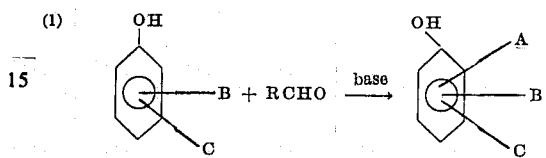

where A is hydroxyalkyl, B is alkylthio, and C is hydrogen, alkyl or aryl, in any order and R is hydrogen or alkyl.

The preferred phenolic moiety employed in forming the novel compounds is ortho cresol. However, phenol itself may be used thereby providing opportunities for greater molar amounts of aldehyde to react therewith. That is, para alkylthiophenol may be reacted to two moles of formaldehyde to form dimethylol alkylthiophenol. Other phenolic moieties that may be employed are set forth in aforementioned U.S. Pat. No. 3,133,971, the only limitation being that at least one ortho or the para position remain open for reaction with the aldehyde.

Alkylthiophenols with either or both ortho positions open or the para position open react with aldehydes in accordance with the present invention. The alkyl group attached to the thio may be any branched or unbranched alkyl having up to about 12 carbon atoms. The alkylthio group (B) may be attached to the phenol ring at either of the ortho positions or the para position. Likewise, the alkylol group (A) attached to the phenol ring may be located at either ortho or at the para position on the ring. Group (C) may be ortho, meta or para.

The hydroxyalkyl group (A) in the foregoing formula (1) is derived from any reactive alkylaldehyde. That is, any alkyl-aldehyde may be used so long as the length of the alkyl chain does not affect the reactivity of the aldehyde. In practice, it is preferred to employ formaldehyde, acetaldehyde, propionaldehyde or butyraldehyde in the reaction. Accordingly, alkylol group (A) in the foregoing formula is preferably up to about four carbon atoms in length.

The group (C) in the above formula may be comprised of hydrogen or any branched, unbranched or cyclic alkyl group. The alkyl group may be any alkyl except those which are so large that they sterically hinder the reaction; preferably those up to about 12 carbon atoms are employed. The alkyl group may be attached to the ring by a carbon-to-carbon linkage, or by an ether linkage as in the case of alkylthio guaiacol. Aryl groups may also be substituted at the (C) position on the foregoing ring.

For ease of reaction, it is preferred in each instance (A, B or C) to employ shorter carbon chains, for example, less than four carbon atoms.

The reaction between the alkylthiophenol and the aldehyde proceeds to a high yield of stable compounds under basic conditions. Preferably, the medium employed has a pH between 12 and 13. However, the reaction can take place with pH outside this range, but with less satisfactory yield. For example, pH between the range of 8 to 14 may be used to produce the novel compounds.

Where group A of the reaction product is hydroxymethyl, group B is methylthio, and group C is methyl, the substituted thiophenol of this invention may be obtained in high yield as a stable compound. In this regard, the compound of this invention differs from hydroxymethyl derivatives of phenol which are unstable as intermediates. That is, phenol-formaldehyde reaction intermediates ordinarily are not obtained in high yield because of their instability.

EXAMPLE I

The reaction of formaldehyde with 4-methylthio-orthocresol takes place readily under alkaline catalysis and is essentially complete in one hour at a reaction temperature of 60°–70° C. One mole (154 g.) of 4-methylthio-ortho-cresol was placed in a one liter flask equipped with a nitrogen sweep and a condenser. One mole of sodium hydroxide was added as 400 grams of 10 percent aqueous NaOH. 1.5 moles formaldehyde was added as 125 ml of 36 percent formalin. A nitrogen atmosphere was provided and the solution heated to about 50° C., whereupon the exothermic reaction raised the temperature further to 68°–70° C. This occurred during the first 15 minutes. The temperature was allowed to fall to 60° C. during the next hour. After a total heating time of 1 to 1-¼ hours, the solution was cooled to room temperature, poured into about an equal volume of water and acidified with dilute hydrochloric acid to a pH of 9.5. The crude product was filtered, washed with water and dried to give 169 g. of light tan crystals, melting at 82°–84° C. This represents 92 percent of the theoretical yield. Recrystallization of a sample from benzene-petroleum ether gave colorless crystals melting at 84.5°–86° C. The compound is soluble in acetone, alcohols, benzene, chloroform and ether, and insoluble in carbon tetrachloride, petroleum ether and water.

The novel products of this invention may further be reacted through the hydroxyalkyl (A) group with other phenols using a catalytic amount of sulfuric acid or methane sulfuric acid. The phenolic reactant should have a mole ratio to the novel compound of this invention of between 5 and 10 to 1. The reaction proceeds to form a substituted phenol with sulfur-containing radicals at the ortho and/or para positions. Similarly, the compound of this invention may be reacted with amines, such as melamine or dialkyl amines. The condensation reaction forms products useful as Mannich bases. In the case of melamine, 3 moles of the novel product react with 1 mole of melamine to form a polythio product according to the following equation where the novel product is exemplified by 2-hydroxymethyl-4-methyl-thio-ortho-cresol:

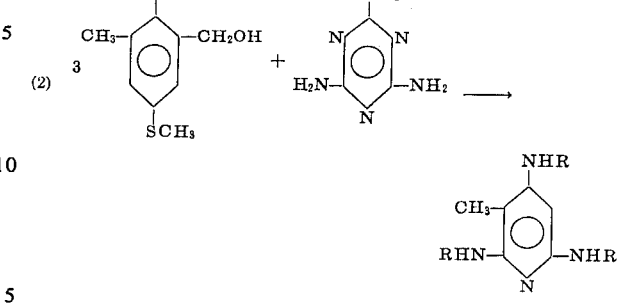

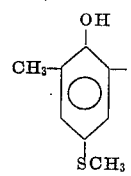

where R is hydrogen and/or the radical

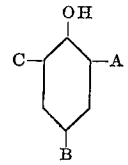

depending upon the degree of substitution.

The novel compounds are also useful as components in polymer formation such as with phenol-formaldehydes; melamine-formaldehydes; and urea formaldehyde. Moreover, the compound of this invention is bifunctional, so that it participates in reactions to form polyesters and polyurethanes.

The alkylthio group of the novel compounds may be modified to form sulfones, sulfoxides, and sulfonium compounds which provide enhanced dye receptivity or retention properties.

I claim:

1. A substituted phenol having the formula

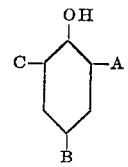

wherein A is a hydroxyalkyl having from one to three carbon atoms, B is an alkylthio having from one to 12 carbon atoms and C is selected from the group consisting of hydrogen, or an alkyl group having from one to 12 carbon atoms.

2. A substituted phenol having the formula

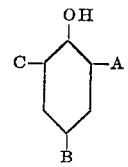

wherein A is hydroxymethyl, B is methylthio, and C is methyl.

* * * * *